June 3, 1930.  S. E. STROMBERG  1,760,920
TESTING SYSTEM
Filed March 30, 1929  2 Sheets-Sheet 1

INVENTOR
S. E. Stromberg
BY
ATTORNEY

June 3, 1930.  S. E. STROMBERG  1,760,920
TESTING SYSTEM
Filed March 30, 1929  2 Sheets-Sheet 2

INVENTOR
S. E. Stromberg
BY
ATTORNEY

Patented June 3, 1930

1,760,920

UNITED STATES PATENT OFFICE

SVEN E. STROMBERG, OF NEW YORK, N. Y., ASSIGNOR TO AMERICAN TELEPHONE AND TELEGRAPH COMPANY, A CORPORATION OF NEW YORK

TESTING SYSTEM

Application filed March 30, 1929. Serial No. 351,414.

This invention relates to a testing system which is particularly adapted for testing electrical conductors.

In a testing system such as is used in connection with the installation and maintenance of conductors, and especially conductors in cables and the like, it is customary to use a telephone receiver and condenser to make certain tests of the conductors. These tests of conductors may consist of identifying pairs, detecting defective pairs, or numerous other well known tests. It is common practice to connect a condenser in series with the telephone receiver to eliminate false signals at a central office. The telephone receiver and condenser have been heretofore used in separated relation, and for this reason have been found cumbersome and inconvenient to employ in testing operations.

Accordingly, it is one of the objects of this invention to provide a testing system of the character mentioned above, which is of a simple and compact nature.

Another object is to provide a testing system which is efficient and comparatively inexpensive.

These and further objects will be apparent form the following description, when considered in connection with the accompanying drawing, in which one embodiment of the invention is illustrated.

Figure 1:
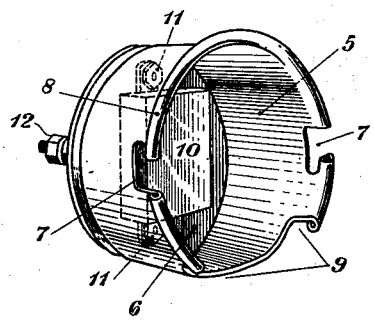
Figure 2:
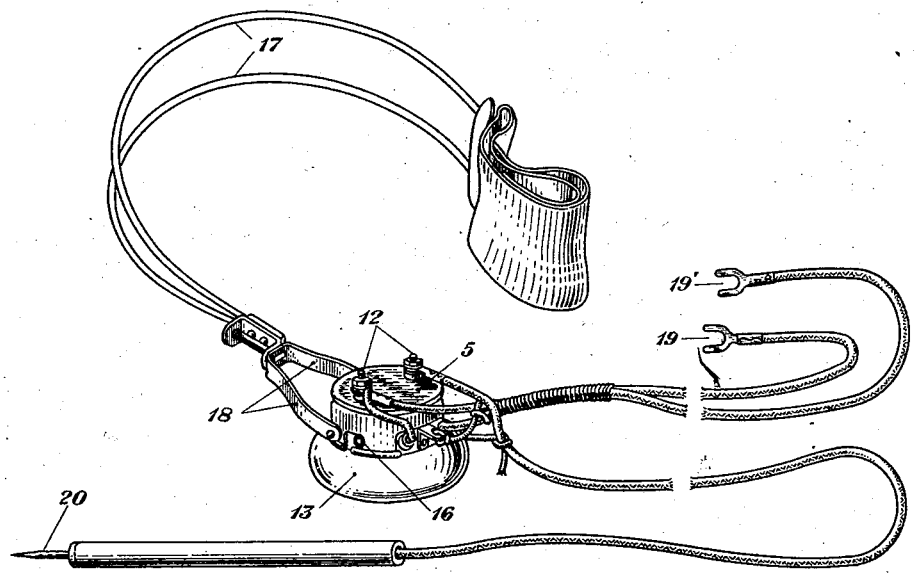
Figure 3:
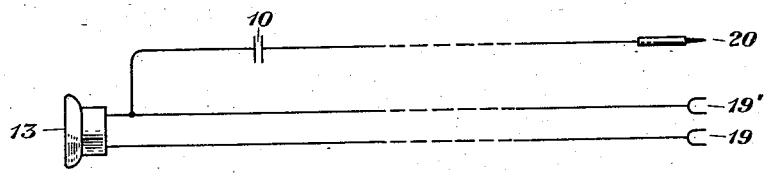
Figure 4:
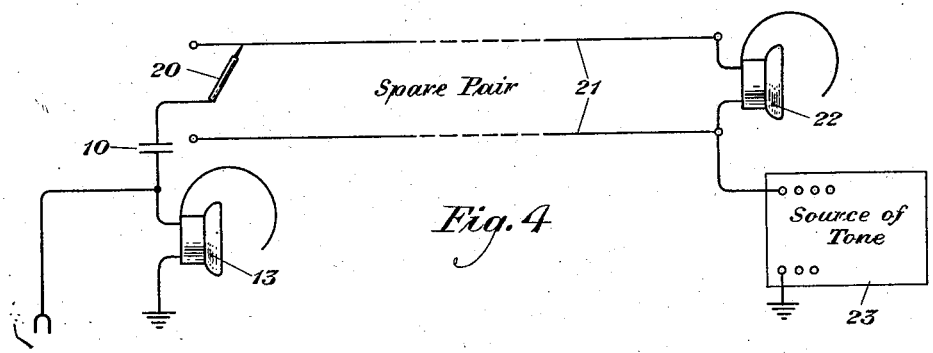
Figure 5:
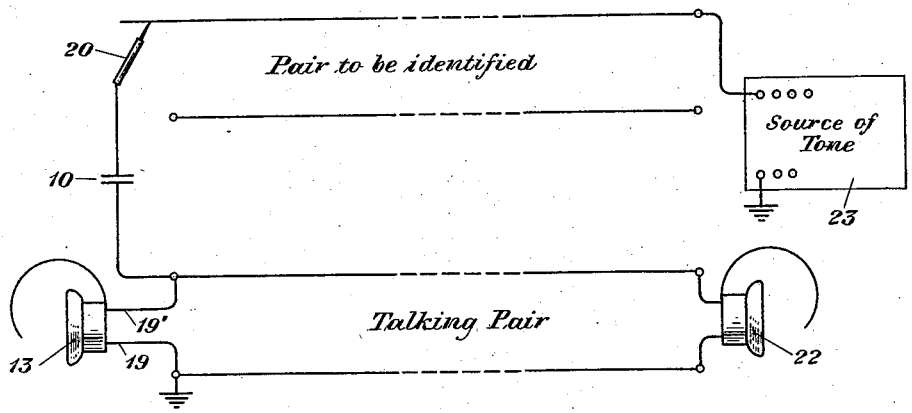

Referring to the drawing, Figure 1 is a perspective view of a shell member carrying a condenser; Fig. 2 is a perspective view of a watch-case receiver with the shell member and associated equipment connected thereto; Fig. 3 is a diagram of the circuit connecting the receiver and condenser; and Figs. 4 and 5 are typical circuit diagrams to which the improved testing system may be applied.

In the drawing the numeral 5 indicates a shell member of cylindrical shape having a closed end 6. The cylindrical wall of the shell member is provided with slots 7, 7 which extend through the rim 8 at the open end of the shell member and are positioned approximately 180 degrees apart. A cut-away portion 9 is provided between the slots 7 and extends through said rim. The portion 9 permits the connection of electrical conductors with a watch-case reseiver to be presently described. A condenser 10 of desired capacitance is attached to the end 6, and lies within the chamber of the shell member. In the present instance, the condenser is shown, for the purpose of illustration, as being attached to the shell member by means of screws 11. These screws engage lugs extending from the condenser 10, and are threaded into the closed end 6. However, other means may be provided for attaching the condenser to the shell member, or it may be suitably sealed thereto by paraffin or the like. The condenser is preferably enclosed in a casing and insulated therefrom in the usual manner. The condenser 10 is connected to terminals 12 positioned on the end 6 of the shell member by conductors which pass in insulated relation through said end.

The shell member 5 is adapted to be clamped on a watch-case receiver 13. This receiver may be of the ordinary type consisting of an ear-piece and a cylindrical portion extending therefrom. The cylindrical portion is provided with a pair of studs 16 which project outwardly from its wall and lie at approximately 180 degrees from each other. The shell member 5 fits over the cylindrical portion, and its circumference is of such dimension that when in position it makes a snug connection therewith. The slots 7 and studs 16 register with each other when the shell member and receiver are in joined relation and form a bayonet joint. These members are thus maintained in clamped postion. When the receiver and shell member are in joined relation, the cut-away portion 9 of the shell member will be positioned at a point where the electrical conductors enter the receiver to be connected to the magnets of such receiver in a well known manner. The cut-away portion thus provides a clearance for the conductors, and also eliminates interference by such conductors in the attachment or detachment of the shell member and receiver.

The receiver 13 may be provided with a head-band 17 which may terminate at one end in forked members 18 as illustrated in Fig. 2.

The end of the forked members 18 may have pins projecting from their extremities which engage orifices in the stud members 16 to pivotally connect the head-band with the receiver. The stud members 16 thus perform the double function of providing, with the slots 7 of the shell member, a bayonet joint and also a pivotal mounting for the head-band.

The receiver and condenser are connected in series relation by a conductor extending from the receiver to one of the terminals 12 on the end 6 of the shell member. The condenser and receiver may have a plurality of leads connected therewith. In the present instance, as shown in Figs. 2 and 3, there are three leads provided, two of which terminate in contact lugs 19 and 19' and the other in a test point 20. Clips, of course, or other means by which the leads may be connected to terminals, may be substituted for the lugs, if desired. The test point 20 is applied to a conductor to test the circuit to determine its condition, as will be explained in connection with the examples illustrated in Figs. 4 and 5.

To establish a talking circuit in a multi-conductor cable, the usual practice is to connect a receiver across a spare pair of conductors in the cable, and connect a tone between the pair of conductors and ground at one cable end. At the other cable end the various conductors are tested by a receiver in series with a condenser to ground. Tone heard in the receiver is an indication that the proper pair has been found. This testing system can be used for this purpose by connecting terminal 19 to ground and applying the test point 20 to the various cable conductors until the proper conductor is found, as will be more clearly indicated by reference to Fig. 4. When the proper conductors are found the testman connects his receiver 13 across the spare pair, using terminals 19 and 19', thereby establishing a talking circuit with a testman at the other end of the cable.

Other conductors in the cable may be then identified, using the connections indicated in Fig. 5. The various cable conductors are tested by means of the test point 20, and when the proper conductor is located the testman at each end of the line hears a tone in his receiver.

The use of a condenser of small capacitance in series with the test point prevents false signals on working subscriber lines which by chance may be tested while searching for a desired conductor.

While only two examples of the use of the improved testing system have been illustrated and described, it will be understood that this system is capable of being utilized in other testing circuits in which a condenser and receiver are employed.

What is claimed is:

1. A testing system comprising a watch-case receiver, a shell member shaped to be mounted on the outside of the receiver, a condenser carried by the shell member, and means for attaching the shell member and its associated condenser to the receiver.

2. A testing system comprising a watch-case receiver, a shell member shaped to fit over the receiver, a condenser carried by the shell member, and means to secure the receiver and shell member by a bayonet joint connection.

3. A testing system comprising a watch-case receiver, a shell member adapted to fit over the receiver, a condenser carried by said shell member in insulated relation from said shell member, and means for securing the shell member and receiver by a bayonet joint connection.

In testimony whereof, I have signed my name to this specification this 27th day of March, 1929.

SVEN E. STROMBERG.